United States Patent
Chakraborty et al.

(10) Patent No.: US 12,238,194 B2
(45) Date of Patent: Feb. 25, 2025

(54) MULTI-STAGE BURST DETECTION FOR COMMUNICATIONS SYSTEMS

(71) Applicant: VIASAT, INC., Carlsbad, CA (US)

(72) Inventors: Kaushik Chakraborty, San Diego, CA (US); Srikar Potta, San Marcos, CA (US); Aniruddha Das, San Marcos, CA (US); James E. Petranovich, San Diego, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 17/917,532

(22) PCT Filed: Apr. 6, 2021

(86) PCT No.: PCT/US2021/026056
§ 371 (c)(1),
(2) Date: Oct. 6, 2022

(87) PCT Pub. No.: WO2021/207279
PCT Pub. Date: Oct. 14, 2021

(65) Prior Publication Data
US 2023/0134051 A1    May 4, 2023

Related U.S. Application Data

(60) Provisional application No. 63/005,997, filed on Apr. 6, 2020.

(51) Int. Cl.
*H04L 7/00* (2006.01)
*H04L 1/00* (2006.01)
*H04L 1/24* (2006.01)

(52) U.S. Cl.
CPC ............ *H04L 7/0054* (2013.01); *H04L 1/005* (2013.01); *H04L 1/24* (2013.01)

(58) Field of Classification Search
CPC .............................. H04L 7/0054; H04L 1/005
See application file for complete search history.

(56) References Cited

U.S. PATENT DOCUMENTS

| | | |
|---|---|---|
| 4,630,267 A | 12/1986 | Costes et al. |
| 4,686,672 A | 8/1987 | Namiki |
| 4,712,212 A | 12/1987 | Takai et al. |
| 5,072,445 A | 12/1991 | Nawata |

(Continued)

FOREIGN PATENT DOCUMENTS

| | | |
|---|---|---|
| CN | 101719884 | 4/2012 |
| CN | 101667861 | 11/2012 |

(Continued)

OTHER PUBLICATIONS

International Search Report and Written Opinion for Int'l App. No. PCT/US2021/026056, dated Jun. 29, 2021, in 17 pages.

(Continued)

*Primary Examiner* — Joseph D Torres
(74) *Attorney, Agent, or Firm* — Chang & Hale LLP

(57) ABSTRACT

Systems and methods are described that enable user terminals to eliminate or reduce the number of dummy bursts (or bursts with no data) they send. The systems and methods use two burst detectors, a first burst detector that analyzes the physical structure of the signal, and a second burst detector that analyzes the informational structure of the signal. Output from the first burst detector can be used to control operation of a signal decoder that decodes received signals. The second burst detector analyzes output from the signal decoder to determine the second burst indicator. In other words, the first burst detector can be implemented prior to decoding the received signal to provide a first estimate related to the presence or absence of a burst. This can then be used to limit the amount of processing performed by the signal decoder.

32 Claims, 11 Drawing Sheets

(56) References Cited

U.S. PATENT DOCUMENTS

| | | | | |
|---|---|---|---|---|
| 5,661,760 | A * | 8/1997 | Patapoutian | G11B 20/10009 |
| 6,697,344 | B1 | 2/2004 | Carrozza et al. | |
| 7,050,419 | B2 | 5/2006 | Azenkot et al. | |
| 7,136,432 | B2 | 11/2006 | Min et al. | |
| 7,180,881 | B2 | 2/2007 | DiFazio | |
| 7,729,456 | B2 | 6/2010 | Zhang | |
| 7,802,167 | B1 * | 9/2010 | Gorshe | H03M 13/09 |
| | | | | 714/762 |
| 8,693,590 | B2 | 4/2014 | Kang et al. | |
| 8,699,628 | B2 | 4/2014 | Han et al. | |
| 10,536,188 | B2 | 1/2020 | Kim et al. | |
| 2004/0048574 | A1 * | 3/2004 | Walker | H03K 5/133 |
| | | | | 455/63.1 |
| 2005/0097431 | A1 | 5/2005 | Nieminen | |
| 2008/0124092 | A1 * | 5/2008 | Dvir | H04L 7/0337 |
| | | | | 398/155 |
| 2014/0029449 | A1 * | 1/2014 | Xu | H04L 43/10 |
| | | | | 370/252 |
| 2014/0247814 | A1 | 9/2014 | Zhang et al. | |
| 2015/0289228 | A1 * | 10/2015 | Sikri | H04W 68/025 |
| | | | | 370/328 |
| 2017/0280396 | A1 | 9/2017 | Si et al. | |

FOREIGN PATENT DOCUMENTS

| | | |
|---|---|---|
| CN | 105530078 | 4/2016 |
| CN | 104821927 | 1/2018 |
| CN | 110071756 | 7/2019 |
| EP | 0 035 230 B1 | 9/1981 |
| EP | 3 522 392 A1 | 8/2019 |
| GB | 2 371 952 A | 8/2002 |
| JP | 04262631 A | 9/1992 |
| JP | 94048795 B2 | 6/1994 |
| JP | 2632083 B2 | 7/1997 |
| JP | 2001292128 A | 10/2001 |
| JP | 2005348412 A | 12/2005 |
| WO | 2002/030004 A2 | 4/2002 |
| WO | 2011/059419 A1 | 5/2011 |
| WO | 2015/157890 A1 | 10/2015 |

OTHER PUBLICATIONS

International Preliminary Report on Patentability for Int'l App. No. PCT/US2021/026056, dated Aug. 2, 2022, in 8 pages.

* cited by examiner

MULTI-STAGE BURST DETECTION FOR COMMUNICATIONS SYSTEMS

CROSS-REFERENCE TO RELATED APPLICATIONS

This application claims priority to U.S. Prov. App. No. 63/005,997 filed Apr. 6, 2020 and entitled "SATELLITE COMMUNICATION SYSTEM BURST DETECTOR," which is expressly incorporated by reference herein in its entirety for all purposes.

BACKGROUND

Field

The present disclosure generally relates to detecting the presence or absence of bursts from a user terminal in a communications system.

Description of Related Art

Network communications involve sending data back and forth between nodes, such as a content server and a user terminal. To send user data over a network, a scheduler can be used to allocate network resources to devices, creating a schedule of transmission for devices. Then, based on the schedule, the individual devices can transmit data using the allocated resources. Based on the schedule, a user terminal can transmit data to a receiver that is part of the communications system to be forwarded to a final destination.

SUMMARY

The disclosure relates to a receiver of a communications system. The receiver includes a first burst detector configured to receive a digitized signal transmitted over a channel and to generate a first burst indicator by analyzing a physical structure of the receive digitized signal to determine whether a burst is present in the received digital signal. The receiver includes a second burst detector configured to generate a second burst indicator by analyzing an informational structure of a decoded signal that corresponds to the received digital signal to determine whether a burst is present in the received digital signal.

In some embodiments, the receiver further includes an iterative decoder configured to decode the received digitized signal by iteratively processing the received digital signal to generate the decoded signal, a number of iterations affected by the first burst indicator generated by the first burst detector. In further embodiments, the iterative decoder and the first burst detector operate at least partially in parallel. In further embodiments, the number of iterations is limited to a minimum iteration number if the first burst indicator indicates a burst is absent in the received digital signal and is limited to a maximum iteration number if the burst indicator indicates a burst is present in the received digital signal, where the maximum iteration number is greater than or equal to the minimum iteration number. In further embodiments, the number of iterations is between the minimum iteration number and the maximum iteration number responsive to the first burst indicator indicating a burst is uncertain in the received digital signal. In further embodiments, the first burst detector estimates a probability that a burst is present in the received digital signal and the number of iterations is affected by the estimated probability.

In some embodiments, the first burst detector analyzes the physical structure of the received digital signal using a data-aided analysis based on known pilot symbols. In further embodiments, the known pilot symbols comprise ambles of the received digital signal. In further embodiments, the first burst detector analyzes the physical structure of the received digital signal using a Neyman-Pearson generalized likelihood ratio test (NP-GLRT). In further embodiments, the first burst detector analyzes the physical structure of the received digital signal using a constant false alarm rate (CFAR) detector. In further embodiments, the constant false alarm rate detector comprises a constant false alarm rate sum of ratios (CFAR-SOR) detector. In further embodiments, the constant false alarm rate detector comprises a constant false alarm rate ratio of sums (CFAR-ROS) detector.

In some embodiments, the first burst detector analyzes the physical structure of the received digital signal using a signal to noise ratio estimator. In some embodiments, the first burst detector analyzes the physical structure of the received digital signal using a total power estimator.

In some embodiments, the first burst detector analyzes the physical structure of the received digital signal by estimating a probability that a burst is present in the received digital signal. In further embodiments, the first burst indicator corresponds to the estimated probability that a burst is present in the received digital signal. In further embodiments, the receiver further includes an iterative decoder configured to decode the received digitized signal by iteratively processing the received digital signal to generate the decoded signal, behavior of the iterative decoder affected by the first burst indicator. In further embodiments, the first burst indicator indicates that a burst is present in the received digital signal responsive to the estimated probability being greater than a first value and that a burst is absent responsive to the estimated probability being less than the first value. In further embodiments, the first value is based on a targeted false alarm probability. In further embodiments, the first burst indicator indicates that a burst is present in the received digital signal responsive to the estimated probability being greater than a first value, that a burst is absent responsive to the estimated probability being less than a second value, and that a burst is uncertain responsive to the estimated probability being between the first value and the second value. In further embodiments, the receiver further includes an iterative decoder configured to decode the received digitized signal by iteratively processing the received digital signal to generate the decoded signal, a number of iterations set to a minimum iteration value responsive to the first indicator indicating that the burst is absent, the number of iterations set to a maximum iteration value responsive to the first indicator indicating that the burst is present, and the number of iterations set to a medium iteration value between the minimum iteration value and the maximum iteration value responsive to the first indicator indicating that the burst is uncertain.

In some embodiments, the second burst detector analyzes the informational structure of the decoded signal by analyzing a total power estimate of the received digital signal to generate the second burst indicator. In some embodiments, the second burst detector analyzes the informational structure of the decoded signal by analyzing a signal-to-noise ratio of the received digital signal to generate the second burst indicator. In some embodiments, the second burst detector analyzes the informational structure of the decoded signal by analyzing a Q2 value or an I2 value of the decoded signal to generate the second burst indicator. In some embodiments, the second burst detector analyzes the informational structure of the decoded signal by analyzing a decoder error parameter associated with the decoded signal to generate the second burst indicator.

The disclosure relates to a method for determining the presence of a burst in a communications system. The method includes receiving a digitized signal transmitted over a channel. The method includes generating a first burst indicator using a first burst detector by analyzing a physical structure of the receive digitized signal to determine whether a burst is present in the received digital signal. The method includes generating a second burst indicator using a second burst detector by analyzing an informational structure of a decoded signal that corresponds to the received digital signal to determine whether a burst is present in the received digital signal.

In some embodiments, the method further includes decoding the received digitized signal by iteratively processing the received digital signal to generate the decoded signal, a number of iterations affected by the first burst indicator. In further embodiments, decoding and generating the first burst indicator occur at least partially in parallel. In further embodiments, the number of iterations is limited to a minimum iteration number if the first burst indicator indicates a burst is absent in the received digital signal and is limited to a maximum iteration number if the burst indicator indicates a burst is present in the received digital signal, where the maximum iteration number is greater than or equal to the minimum iteration number. In further embodiments, the number of iterations is between the minimum iteration number and the maximum iteration number responsive to the first burst indicator indicating a burst is uncertain in the received digital signal. In further embodiments, the method further includes estimating a probability that a burst is present in the received digital signal and the number of iterations is affected by the estimated probability.

In some embodiments, analyzing the physical structure of the received digital signal uses a data-aided analysis based on known pilot symbols. In further embodiments, the known pilot symbols comprise ambles of the received digital signal. In further embodiments, analyzing the physical structure of the received digital signal uses a Neyman-Pearson generalized likelihood ratio test (NP-GLRT). In further embodiments, analyzing the physical structure of the received digital signal uses a constant false alarm rate (CFAR) detector. In further embodiments, the constant false alarm rate detector comprises a constant false alarm rate sum of ratios (CFAR-SOR) detector. In further embodiments, the constant false alarm rate detector comprises a constant false alarm rate ratio of sums (CFAR-ROS) detector.

In some embodiments, analyzing the physical structure of the received digital signal uses a signal to noise ratio estimator. In further embodiments, analyzing the physical structure of the received digital signal uses a total power estimator.

In some embodiments, analyzing the physical structure of the received digital signal estimates a probability that a burst is present in the received digital signal. In further embodiments, the first burst indicator corresponds to the estimated probability that a burst is present in the received digital signal. In further embodiments, the method further includes decoding the received digitized signal by iteratively processing the received digital signal to generate the decoded signal, decoding affected by the first burst indicator. In further embodiments, the first burst indicator indicates that a burst is present in the received digital signal responsive to the estimated probability being greater than a first value and that a burst is absent responsive to the estimated probability being less than the first value. In further embodiments, the first value is based on a targeted false alarm probability. In further embodiments, the first burst indicator indicates that a burst is present in the received digital signal responsive to the estimated probability being greater than a first value, that a burst is absent responsive to the estimated probability being less than a second value, and that a burst is uncertain responsive to the estimated probability being between the first value and the second value. In further embodiments, the method further includes decoding the received digitized signal by iteratively processing the received digital signal to generate the decoded signal, a number of iterations set to a minimum iteration value responsive to the first indicator indicating that the burst is absent, the number of iterations set to a maximum iteration value responsive to the first indicator indicating that the burst is present, and the number of iterations set to a medium iteration value between the minimum iteration value and the maximum iteration value responsive to the first indicator indicating that the burst is uncertain.

In some embodiments, analyzing the informational structure of the decoded signal analyzes a total power estimate of the received digital signal to generate the second burst indicator. In some embodiments, analyzing the informational structure of the decoded signal analyzes a signal-to-noise ratio of the received digital signal to generate the second burst indicator. In some embodiments, analyzing the informational structure of the decoded signal analyzes a Q2 value or an I2 value of the decoded signal to generate the second burst indicator. In some embodiments, analyzing the informational structure of the decoded signal analyzes a decoder error parameter associated with the decoded signal to generate the second burst indicator.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION OF SOME EMBODIMENTS

The headings provided herein, if any, are for convenience only and do not necessarily affect the scope or meaning of the claimed subject matter.

Overview

Figure 1:
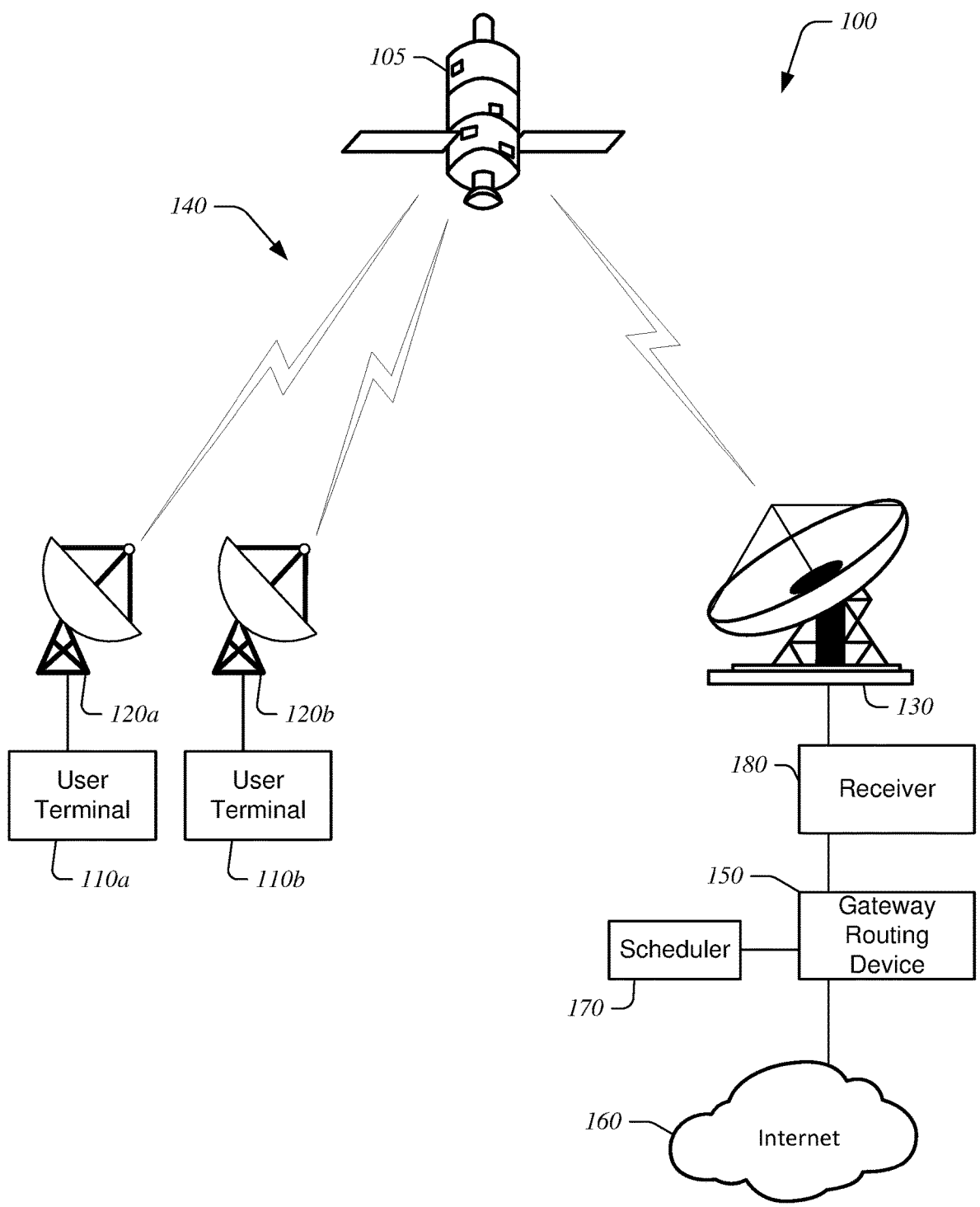
FIG. 1 illustrates a diagram of an example satellite communications network.

FIG. 1 illustrates a diagram of an example satellite communications network 100. The satellite communications network 100 includes a satellite network 140 that communicatively couples a plurality of user terminals 110a, 110b and a gateway routing device 150 to one another and to a network (such as the Internet 160). The satellite communications network 100 includes a scheduler 170 configured to grant resource allocations to the user terminals 110a, 110b. The satellite communications network 100 includes a satellite transceiver 130 configured to transmit and receive signals through the satellite 105. The satellite communications network 100 includes a receiver 180 configured to process and decode modulated signals received from the user terminals 110a, 110b through the satellite transceiver 130. As described herein, the receiver 180 includes two burst detectors that operate on received signals to identify when a burst is present or absent from a user terminal, a first burst detector configured to analyze the physical structure of the received signals, and a second burst detector configured to analyze the informational structure of the received signals. As used herein, the term "burst" can be used to refer to a group of data packets in a receive signal sent by a user terminal and/or one or more data packets in a modulated data signal.

In the satellite communications network 100, it would be advantageous to improve or optimize the use of transmission power on the return link. This is particularly relevant for high-throughput broadband satellite systems, such as the satellite communications network 100. In such a satellite communications network 100, the return link transponder gain may be variable and may be difficult to control tightly. In addition, return link downlink power is a primary contributor to return link capacity. The return link power profile is an aggregate representation of multiple uncoordinated and independent transmissions by user terminals (UTs). Resource grant allocations on the return link are typically determined by the scheduler ahead of time based on aggregate demands of multiple user terminals. However, user terminals may not fully utilize allocated grants depending on instantaneous buffer status, creating variations in the overall return link power profile. In MF-TDMA systems with adaptive beamforming, for example, return link packets have the potential to interfere with other packets transmitted at the same time-frequency resource regardless of the distance separating their transmitters. Thus, it would be beneficial to reduce or eliminate unnecessary transmissions from user terminals. This would improve network resource utilization and improve power usage.

For example, a user terminal may receive an allocation grant of a particular size, such as 32 bytes. If the user terminal only has 20 bytes to send, the user terminal transmits the 20 bytes along with 12 bytes of filler, which may be referred to as padding bytes. Thus, the burst in this case is partially filled. If, on the other hand, the user terminal does not have any data to send, the user terminal may transmit a dummy burst that contains a pre-determined data format. The dummy burst may contain an 8-byte generic MAC header with the remaining 24 bytes filled with OxF. Thus, the burst in this case is empty of actual data, referred to as a dummy burst. Although schedulers and allocation grants are discussed in this disclosure, it is to be understood that the disclosed systems and methods can be used by receivers to determine the presence or absence of bursts in any embodiment where a terminal sends the receiver a burst.

Dummy bursts may be particularly problematic in some communications systems, such as the satellite communications network 100. For example, due at least in part to a relatively large propagation delay between satellite and ground networks, the scheduler 170 may allocate more grants than demanded by user terminals based on their current buffer status. This is because the current buffer status may not reflect future traffic demands. Because every grant request requires traversal of at least a pair of ground-satellite hops, and the response from the scheduler 170 to the user terminals 110a, 110b also requires the same path traversal in reverse, there is an incentive to over-provision resources to combat the relatively high latency in the satellite communications network 100. If the user terminal has nothing to send in these additional grants, then the user terminal typically transmits dummy bursts. In addition, dummy bursts may preclude the use of contention. For example, contention allows multiple terminals to send bursts, if more than one terminal sends a burst in the same resource, there is a collision and the terminal has to re-transmit. In systems where the probability of transmission is low (e.g., low rate sensor networks), retransmission is a viable option. However, if a terminal repeatedly sends a dummy burst, there is a higher chance the bursts would keep colliding.

It would be beneficial to eliminate dummy bursts sent by the user terminals in a communications system, such as the satellite communications system 100. Elimination or reduction of dummy bursts would be beneficial because dummy bursts waste transmission power on the return-link. In addition, the receiver 180 is configured to process dummy bursts along with regular bursts. Thus, it would be advantageous to eliminate or reduce the number of dummy bursts to improve performance of the receiver. However, in typical communications systems, when a user terminal has the opportunity to send a burst, it is required to send a burst. If the user terminal does not have any data to send, it sends a dummy burst instead.

Accordingly, described herein are systems and methods that enable user terminals to eliminate or reduce the number of dummy bursts they send. The systems and methods use two burst detectors that operate on different aspects of signals to identify when a burst is absent. A first burst detector analyzes the physical structure of the signal to generate a first burst indicator indicating the presence or absence of a burst. A second burst detector analyzes the informational structure of the signal to generate a second burst indicator indicating the presence or absence of a burst. The first burst indicator can be used to control operation of a signal decoder that decodes received signals. The second burst detector analyzes output from the signal decoder to determine the second burst indicator. In other words, the first burst detector can be implemented prior to decoding the received signal to provide a first estimate related to the presence or absence of a burst. This can then be used to limit the amount of processing performed by the signal decoder. When there is no burst present in the signal, this can reduce or eliminate processing cycles that may have been otherwise wasted decoding noise (e.g., where no burst was present).

As described herein, the disclosed systems and methods enable the elimination or reduction of dummy bursts from user terminals. A dummy burst is typically easy to identify but requires processing and decoding prior to discarding the dummy burst. On the other hand, the absence of a burst may be difficult to discern. Accordingly, described herein are systems and methods that beneficially discriminate between a selective non-transmission from a user terminal (a burst is absent) and a transmission error (a burst is present but could not be decoded successfully). With this capability, a communications system can configure user terminals to not transmit data when they have no data to send rather than requiring the user terminal to send a dummy burst. This improves the efficiency of the communications system because the user terminals can be configured to transmit only when they have data and may lower the average power profile of the communications system. Another benefit is that the disclosed burst decoders need not be run on every burst that is anticipated. Rather, the disclosed burst detectors can be run on bursts that are present, thereby reducing required computational resources. Another benefit may be the reduction of interference to other return-link transmissions on neighboring beams.

Returning to FIG. 1, the satellite communications network 100 may utilize various network architectures that include space and ground segments. For example, the space segment may include one or more satellites, while the ground segment may include one or more satellite user terminals, gateway terminals, network operations centers (NOCs), satellite and gateway terminal command centers, and/or the like. Some of these elements are not shown in the figure for clarity. The satellite network 140 can include a geosynchronous earth orbit (GEO) satellite or satellites, a medium earth orbit (MEO) satellite or satellites, and/or a low earth orbit (LEO) satellite or satellites.

The user terminals 110a, 110b can include a router and can be configured to receive data to be routed over the satellite communications network 100, including any type of consumer premises equipment (e.g., a telephone, modem, router, computer, set-top box, and the like).

The user terminals 110a, 110b are configured to route data to the satellite network 140 (via respective customer satellite transceivers 120a, 120b). The satellite network 140 includes a forward link for sending information from the gateway routing device 150 to the user terminals 110a, 110b, and a return link for sending information from the user terminals 110a, 110b to the gateway routing device 150. The forward link includes a transmission path from the gateway routing device 150 through a gateway satellite transceiver 130, through a satellite 105 via a satellite uplink channel, to the customer satellite transceivers 120a, 120b via a satellite downlink channel, and to the user terminals 110a, 110b. The return link includes a transmission path from the customer satellite transceivers 120a, 120b, to the satellite 105 via the satellite uplink channel, to the gateway satellite transceiver 130 via the satellite downlink channel, and to the gateway routing device 150. Each transmission channel may utilize multiple satellites and transceivers.

Figure 2A:
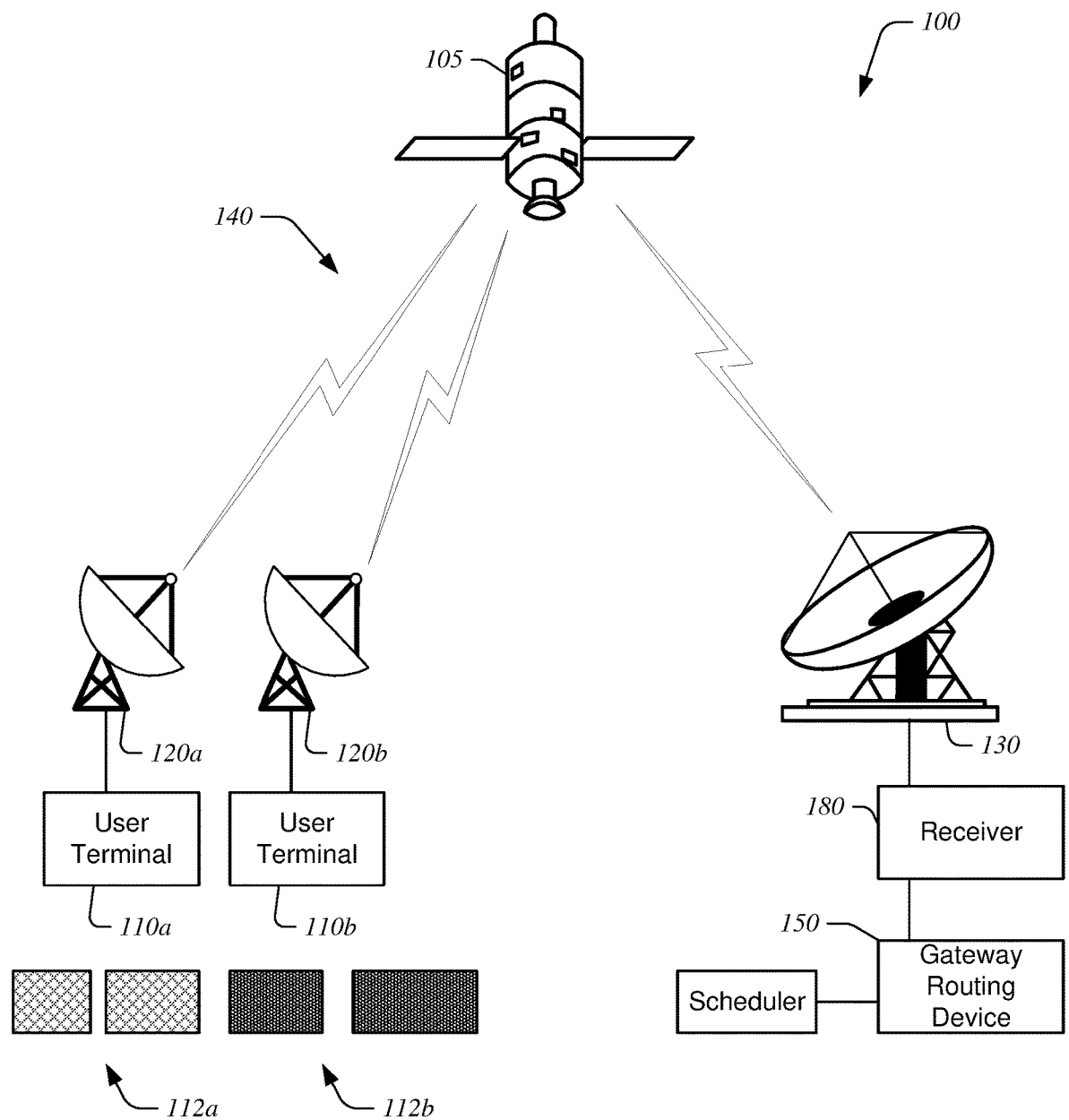
FIGS. 2A, 2B, and 2C illustrate an example of scheduling and transmitting bursts according to an allocated resource schedule in the satellite communications network of FIG. 1.
Figure 2B:
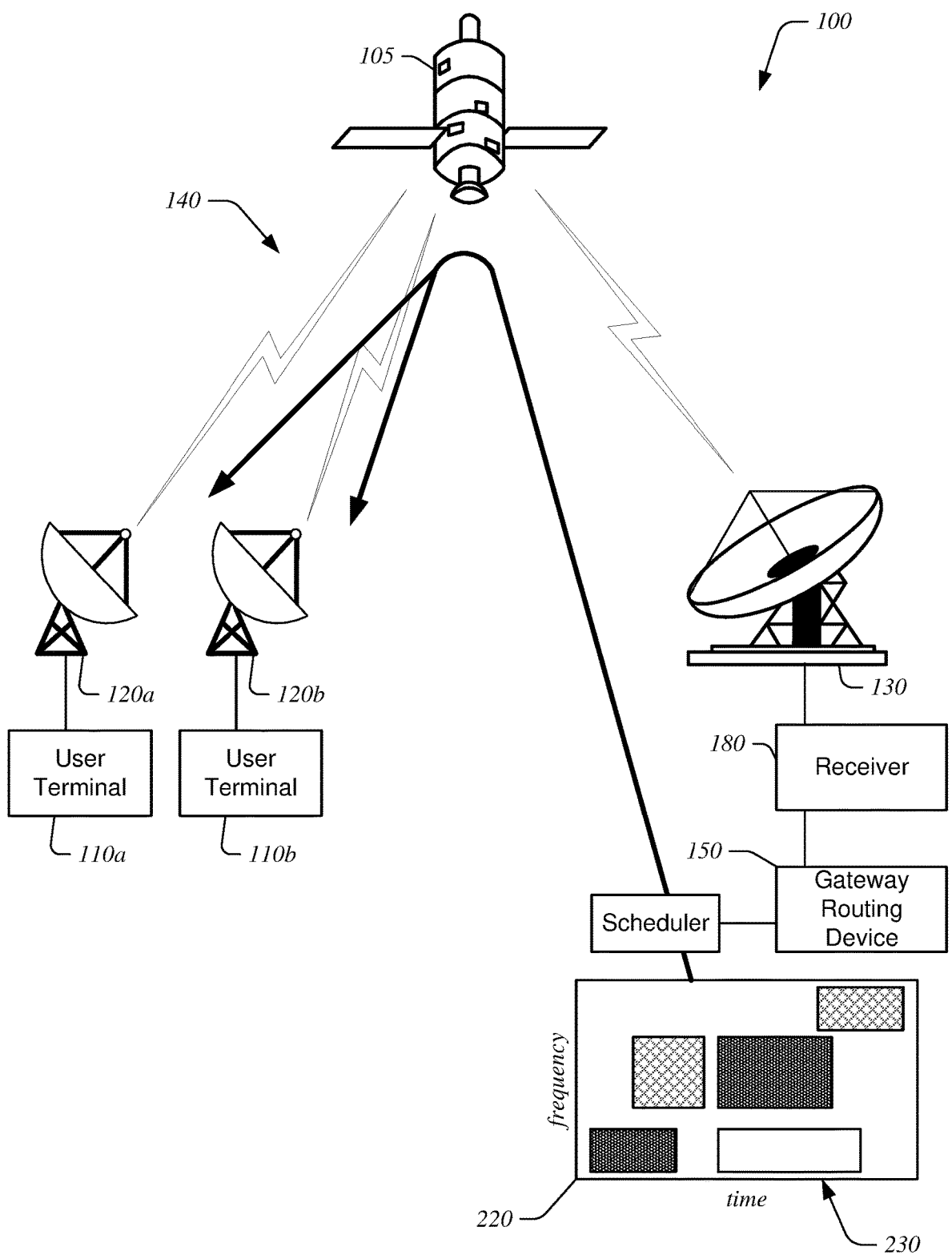
Figure 2C:
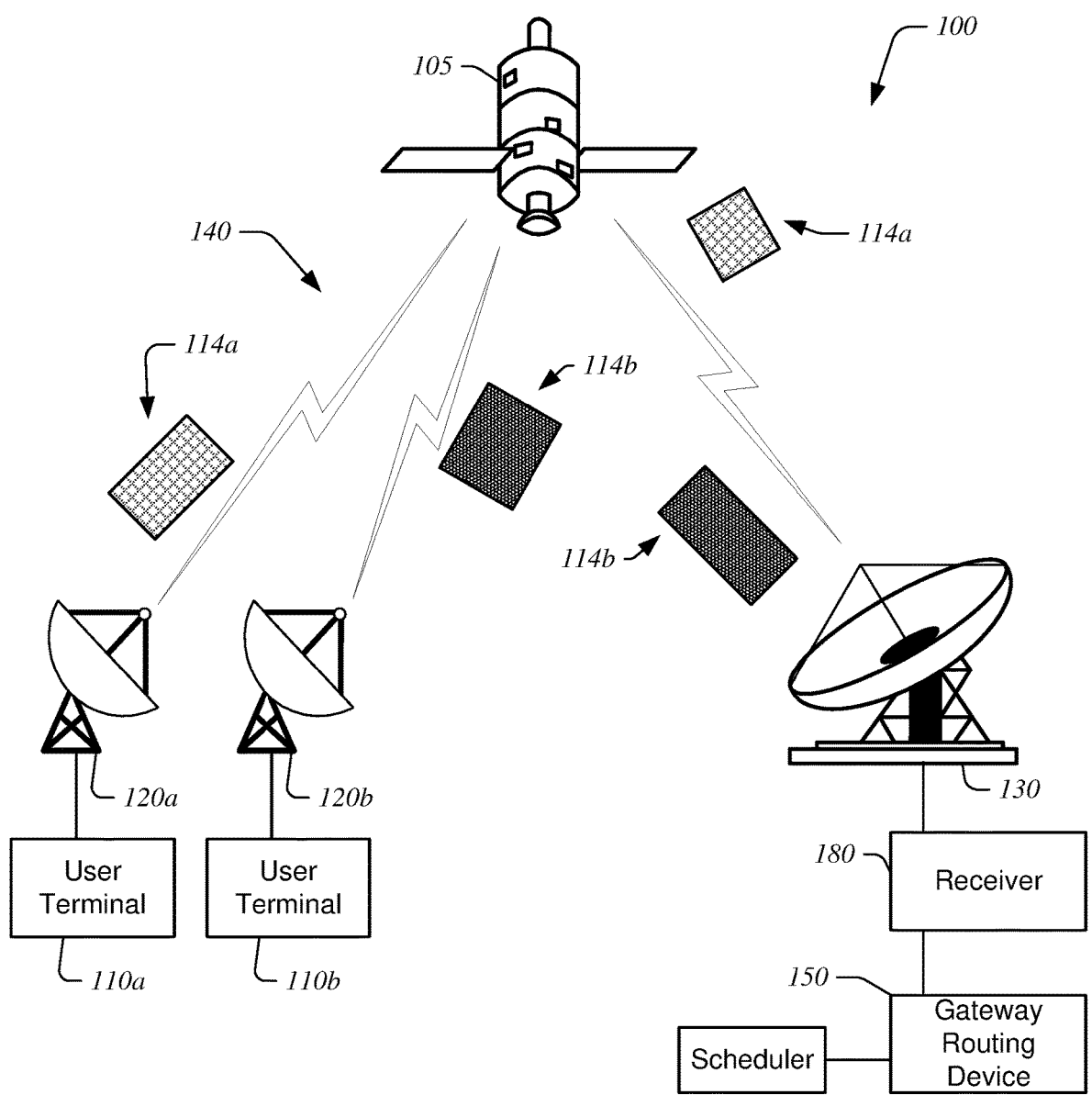

FIGS. 2A-2C illustrate an example of scheduling and transmitting bursts according to an allocated resource schedule in the satellite communications network 100 of FIG. 1. FIG. 2A illustrates that each of the user terminals 110a, 110b requests return-link grants 112a, 112b on the satellite network from the scheduler 170 via the gateway routing device 150. The user terminals 110a, 110b request return-link resources from the scheduler 170 based on buffer size, QoS parameters, and other flow parameters.

FIG. 2B illustrates that the scheduler 170 allocates resource blocks 230 (time-frequency resources) in a slot 220 to serve the bandwidth requests from the user terminals 110a, 110b. These allocations are based on the demands from the user terminals 110a, 110b. The allocation can be transferred to the user terminals 110a, 110b as tables (e.g., RL-MAPs) via broadcast messages, multicast messages, or unicast messages via the gateway routing device 150.

In some embodiments, the scheduler 170 can utilize a demand assigned multiple access (DAMA) scheduling model, an enhanced mobile satellite services (EMSS) scheduling model, and/or other scheduling techniques. Responsive to receiving a request for bandwidth allocation from the user terminals 110a, 110b, the scheduler 170 analyzes the request, network status, network congestion, prior requests, similar requests, and the like to determine a schedule for return-link bandwidth. In some embodiments, the scheduler 170 is configured to generate the schedule based on a prediction or estimation of the actual bandwidth needed to accomplish the request.

FIG. 2C illustrates that the user terminals 110a, 110b transmit data 114a, 114b from their buffers in accordance with the time-frequency resources allocated by the scheduler 170. The user terminals 110a, 110b transmit data to the gateway routing device 150 through the satellite network 140 via the return link. The user terminals 110a, 110b may use all or partial blocks of allocated resources or, if a user terminal has no data to send for an allocated time-frequency resource, the user terminal may elect to not send a burst. The receiver 180 is configured to analyze the data sent by the user terminals 110a, 110b. As disclosed herein, the receiver 180 includes burst detectors configured to discriminate between selective non-transmission of data (e.g., a burst is absent corresponding to an allocated resource grant) and transmitted data (e.g., a burst that fills or partially fills the allocated resource grant) which may contain transmission errors (e.g., a burst was transmitted for the allocated resource grant but the burst contains problems).

After reaching the gateway routing device 150, the data can then be directed to the Internet 160. Data from the Internet 160 can be sent to the user terminals 110a, 110b by the gateway routing device 150 via the forward link of the satellite network 140. In some embodiments, part or all of the gateway routing device 150, the receiver 180, and/or the scheduler 170 can be located in a virtual device residing in a public or private computing cloud and/or as a part of a distributed computing environment.

Figure 3:
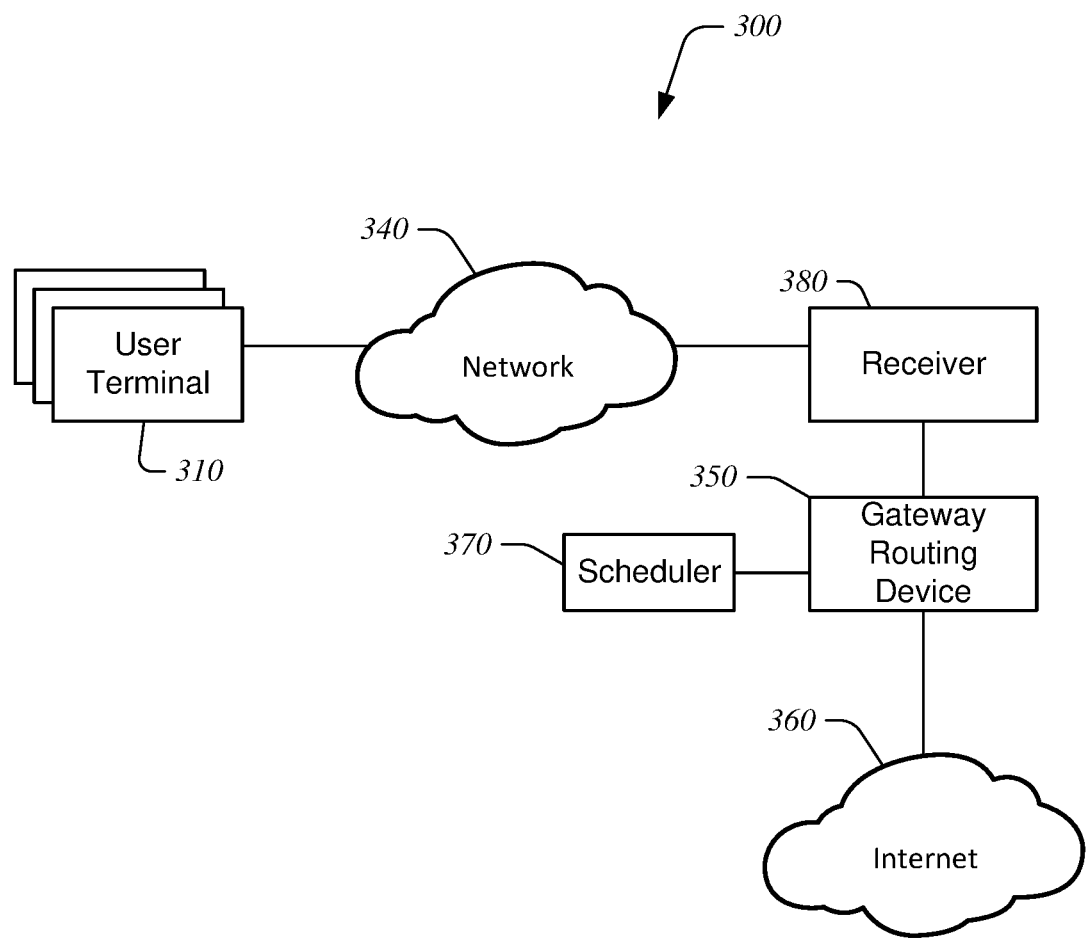
FIG. 3 illustrates an example communications system with a receiver configured to determine when a burst is absent and when a burst is present in a transmission from a user terminal.

FIG. 3 illustrates an example communications system 300 with a receiver 380 configured to determine when a burst is absent and when a burst is present in a transmission from a user terminal. The communications system 300 includes a network 340 configured to communicatively couple a plurality of user terminals 310 to a receiver 380 and to the Internet 360 (or other suitable network). The communications system 300 includes a gateway routing device 350 similar to the gateway routing device 150 of FIG. 1. The communications system 300 includes a scheduler 370 similar to the scheduler 170 of FIG. 1.

The receiver 380 of the communications system 300 is configured to receive transmission bursts from the user terminals 310 through the network 340. The network 340 can be a terrestrial network, a satellite network, or a combination of terrestrial and satellite networks. The receiver 380 includes complementary burst detectors, as described in greater detail herein, that are configured to determine whether a burst is present in a signal corresponding to an allocated resource grant. As described herein, the user terminals 310 can be configured to elect to not transmit data for a particular resource grant allocation of the corresponding user terminal does not have data to transmit. In response, the receiver 380 can be configured to identify that a burst is absent in the signals received corresponding to the particular resource grant allocation. In addition, where a user terminal transmits fully or partially filled bursts for resource grant allocations, the receiver 380 is configured to determine that a burst is present. If a signal received by the receiver 380 has problems, the receiver 380 is configured to determine whether a burst is absent or a burst is present but has problems.

Example Receivers with Two-Stage Burst Detector

Figure 4:
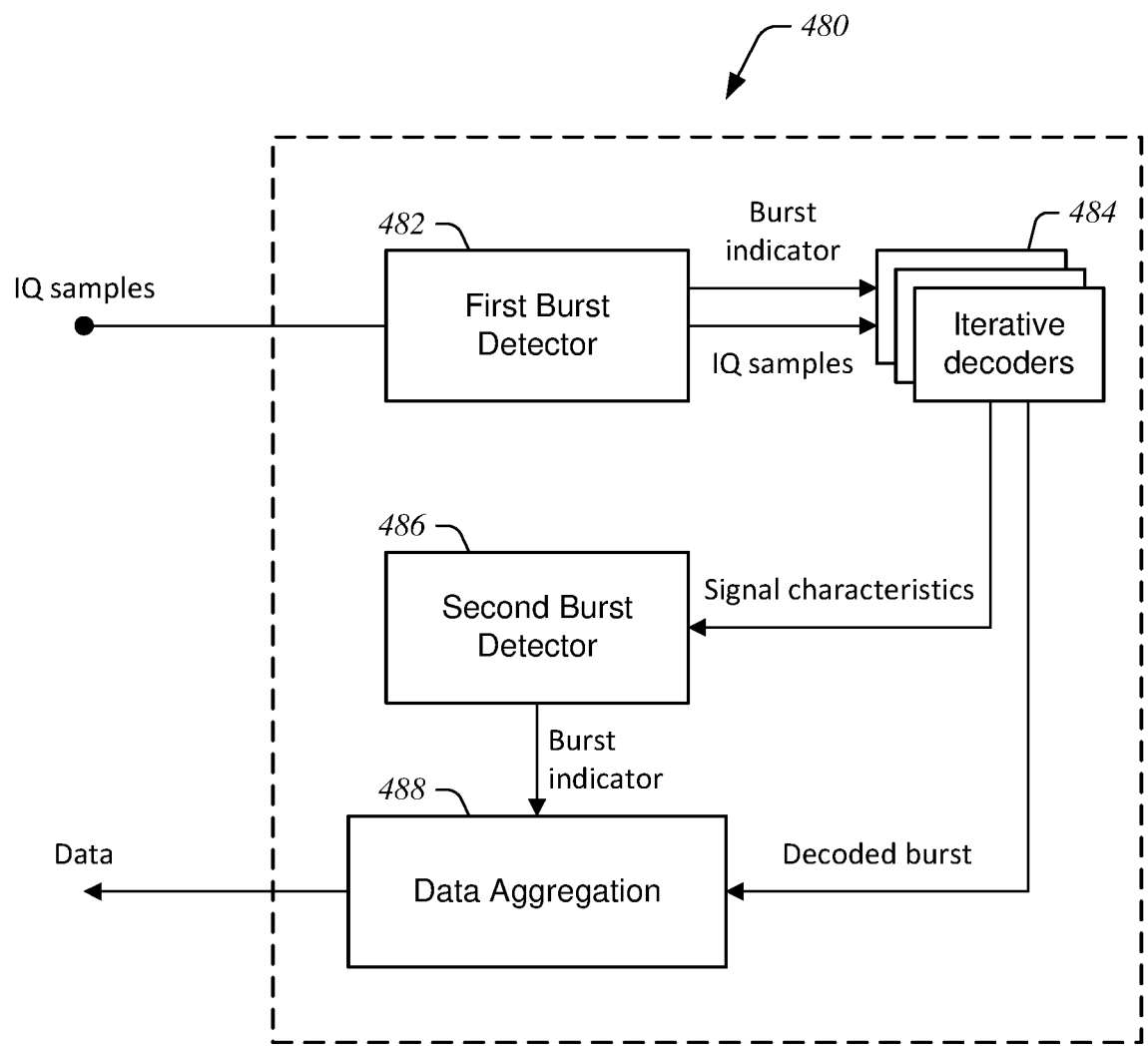
FIG. 4 illustrates an example receiver configured to discriminate between data bursts and selective non-transmission of data.

FIG. 4 illustrates an example receiver 480 configured to discriminate between data bursts and selective non-transmission of data. The receiver 480 can be implemented in the satellite communications system 100 of FIG. 1 and/or the communications system 300 of FIG. 3. The receiver 480 includes a first burst detector 482, iterative decoders 484, a second burst detector 486, and data aggregation 488. The data aggregation 488 accumulates decoded bursts and arranges them in the correct order. For example, multiple bursts can be allocated to different user terminals and each return-link burst may occupy a specific time interval within a timeslot in a frequency channel in an MF-TDMA system. Correct ordering can include time ordering, MAC packetization, mapping to users and service flows, etc.

The receiver 480 is configured to receive a digitized signal over a communication channel and to implement a two-stage burst detector, the two-stage burst detector including the first burst detector 482 and the second burst detector 486. The two-stage burst detector operates on the physical layer of the communications system. The two-stage burst detector analyzes the physical structure of the signal and the informational structure of the signal. The first burst detector 482 and the second burst detector 486 can operate in series or in parallel. The first burst detector 482 and the iterative decoders 484 can operate in series or in parallel. In some embodiments, the communication channel is a return-link channel in a satellite communications system.

The first burst detector 482 is configured to receive a digitized signal transmitted over a communications channel and to generate a first burst indicator by analyzing a physical structure of the receive digitized signal to determine whether a burst is present in the received digital signal. In some embodiments, the first burst detector implements a signal detection algorithm to determine the presence of a burst, as described herein. The first burst detector 482 can generate a first burst indicator corresponding to the result of the analysis of the physical structure. In some embodiments, the first burst indicator is a binary result, indicating that a burst is present or not present. In certain embodiments, the first burst indicator has a plurality of discrete values or outcomes. For example, the first burst indicator can indicate a burst is present, a burst is not present, or a burst is uncertain. As another example, the first burst indicator can indicate levels of confidence pertaining to the presence of a burst (e.g., 0 corresponds to a burst is absent, 1 corresponds to a burst is present, and discrete values between indicate various confidence levels regarding the presence of the burst). In various embodiments, the first burst indicator can any suitable value and may be continuous. For example, the first burst indicator can correspond to an estimated probability that a burst is present in the digitized signal. As another example, the first burst indicator can correspond to a value derived from analysis of the physical structure of the signal, such as an estimate of the signal-to-noise ratio.

The first burst detector 482 is configured to analyze all digitized signals received at the receiver. In contrast, in some embodiments, the second burst detector 486 is configured to analyze signals that are determined to have a burst present by the first burst detector 482. In such embodiments, the second burst detector 486 can be configured to not analyze signals determined to not have a burst present by the first burst detector 482.

The first burst detector 482 is configured to work on one sample per symbol bursts after timing acquisition of the signal (and after de-spreading, if present in the system). In some embodiments, the first burst detector 482 uses a single shot estimator for determining the presence or absence of a burst in the signal, examples of which are described herein. In some implementations, the described single shot estimators work on only the known ambles of each burst, as described herein. In certain embodiments, the first burst detector 482 uses iterative algorithms to determine the presence or absence of a burst in the signal. The described iterative algorithms work on all symbols of the burst, e.g., both the known ambles as well as the unknown data symbols. In some embodiments, the iterative algorithms may involve determining relevant signal parameters, such as a signal-to-noise estimator and/or a signal power estimator.

As an example, the first burst detector 482 can operate on I/Q (in-phase/quadrature) samples. The first burst detector 482 analyzes IQ samples to determine properties of the signal based at least in part on the physical structure of the signal. The IQ samples provide a representation of the actual signal, enabling the first burst detector 482 to look at signal and noise (e.g., the amplitude of the signal and noise over time in complex space). In some embodiments, first burst detector 482 analyzes digitized time-domain samples of the received signal.

The physical structure of the signal refers to a modulated waveform that carries encoded information bits from the transmitter to the receiver 480 over a physical channel (e.g., satellite links or any transmission channel in general). In some implementations, the physical waveform constitutes multi-frequency time-division multiple access (MF-TDMA) "bursts" with a particular structure. The structure can be a particular pattern of ambles and data symbols with a pre-specified number of symbols wherein the a priori location and content of the ambles are known to the receiver. The data symbols come from a known set of finite choices (e.g., a digital constellation like binary phase shift keying (BPSK), quadrature phase shift keying (QPSK), etc.), but the receiver 480 does not know a priori which specific symbol was sent. The first burst detector 482 is configured to analyze the received signal with a known burst structure, but does not know about the unknown data symbols. Thus, the first burst detector 482 is configured to analyze the physical structure of the signal without requiring analysis of the data symbols (e.g., the content of the data symbols).

The first burst detector 482 is programmed with a knowledge of timing to capture the samples spanning the burst duration. In some embodiments, the first burst detector 482 is configured to estimate the timing, frequency, and power. In some embodiments, the first burst detector 482 is configured to receive digital samples of the received signal at the symbol rate of the signal.

The first burst detector 482 is configured to analyze the received signals using a data-aided analysis based on known pilot symbols. In some embodiments, the known pilot symbols comprise ambles of the received digital signal.

Figure 5A:
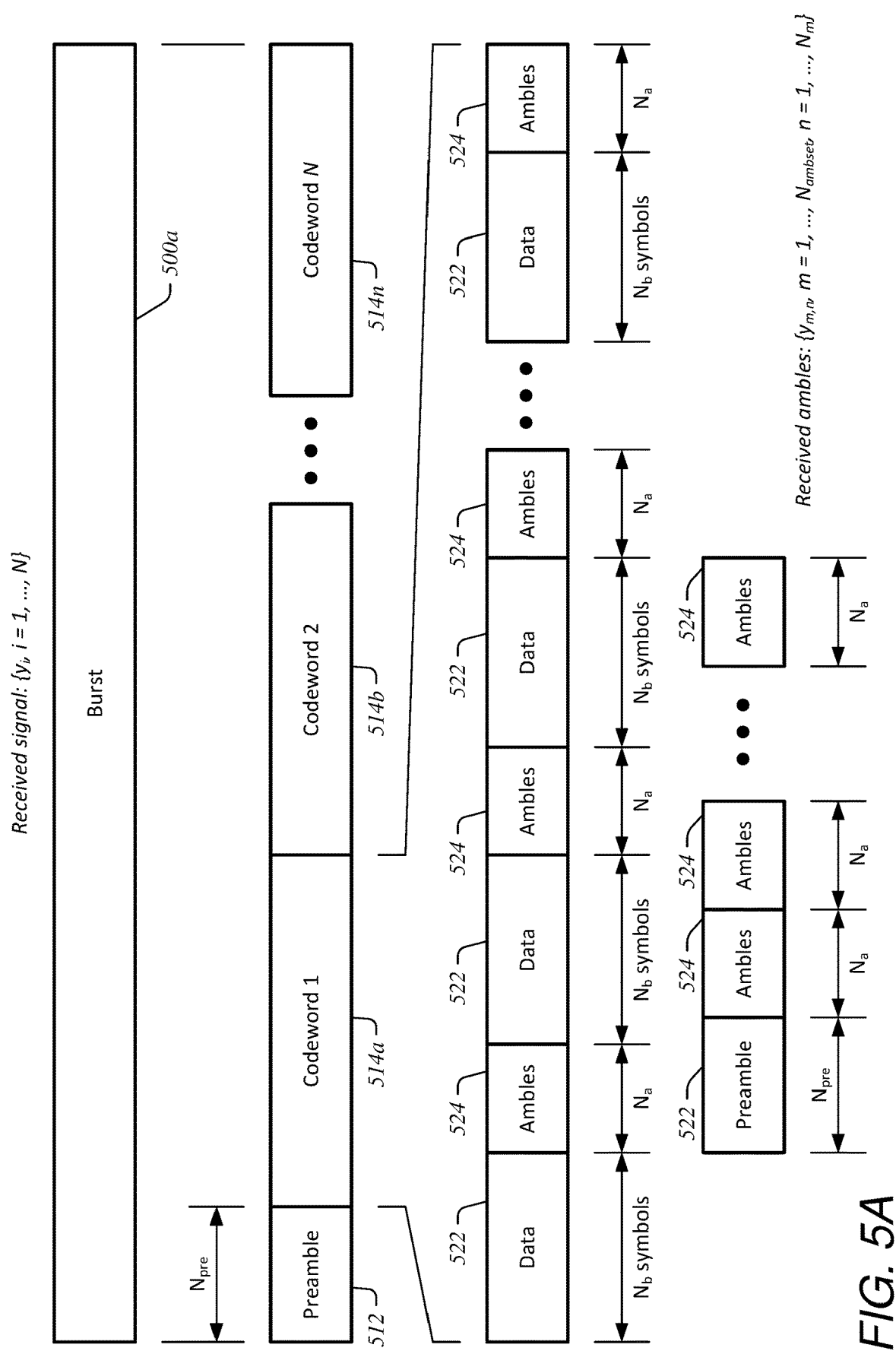
FIGS. 5A and 5B illustrate examples of the structure of a received signal.

To better illustrate the structure of a received signal, FIG. 5A illustrates an example burst 500*a* comprising a preamble 512 and a plurality of codewords 514*a*-514*n*. Each codeword 514 comprises a periodic and repeating pattern of data 522 and ambles 524. Each data 522 includes a number of symbols ($N_b$ symbols) and each amble 524 includes another number of symbols ($N_a$ symbols). Thus, the basic structure of a burst is a preamble followed by repeating sequences of data symbols and ambles, wherein each block of data symbols is the same length and each block of ambles is the same length.

A received burst 500 is expected to have some small frequency error which results in an unknown phase. Amble segments 524 are separated such that the phase in each amble is constant and independent of the phase in adjacent ambles. The frequency error is small enough that across each amble the phase is assumed to be constant. The small frequency error may result in a phase error that increases in time. For a small enough frequency error, it may be assumed that the phase error across adjacent ambles is the same and that the phase errors across groups of ambles separated significantly in time are independent. In addition, the magnitude of the channel gain is assumed to be constant over a burst.

The n-th sample of the m-th amble set can be express as:

$$y_{m,n} = |h|e^{j\Theta_m} x_{m,n} + w_{m,n}, m = 1, \ldots, N_{ambset}, n = 1, \ldots, N_m$$

For the ambles 524, $x_{m,n}$ are known and noise, $w_{m,n}$, are unknown but assumed to be additive white Gaussian noise (AWGN). The channel magnitude and phase of each amble are assumed to be unknown. The first burst detector 482 is configured to work on samples after a signal processing procedure to get rid of modulation:

$$z_{m,n} = y_{m,n} x^*_{m,n} = |h|e^{j\Theta_m} v_{m,n}, m = 1, \ldots, N_{ambset}, n = 1, \ldots, N_m$$

Figure 5B:
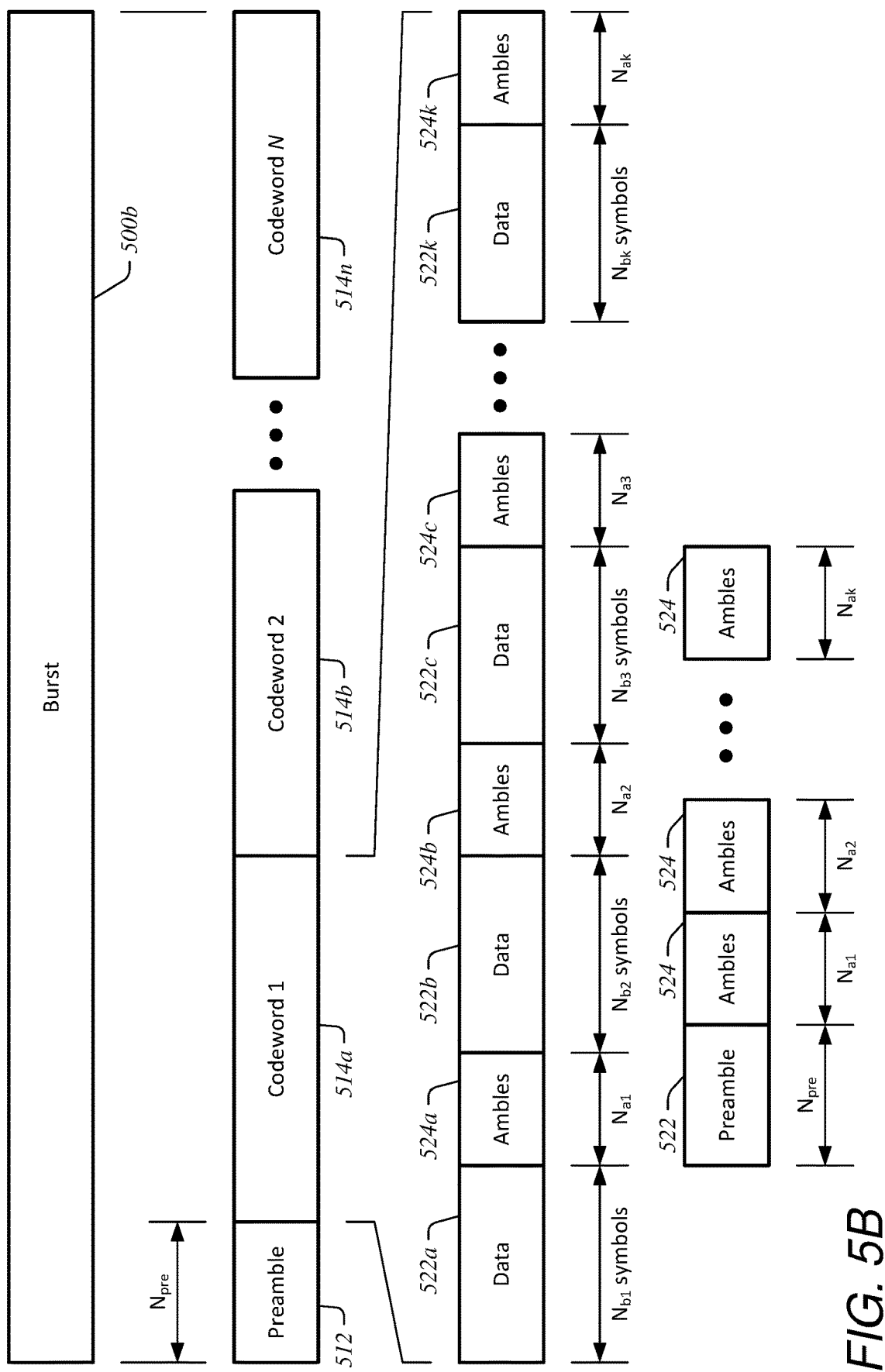

The signal can have a more general structure, as illustrated in FIG. 5B, which illustrates an example burst 500*b* comprising a preamble 512 and a plurality of codewords 514*a*-514*n*. Each codeword 514 comprises a repeating pattern of data 522*a*-522*k* and ambles 524*a*-524*k*. Each data 522*a*-522*k* includes a number of symbols ($N_{b1}, N_{b2}, \ldots N_{bk}$ symbols) and each amble 524 includes another number of symbols ($N_{a1}, N_{a2}, \ldots N_{ak}$ symbols). Each segment can have a different number of symbols. The pattern or structure can be general and because it is known to the detector, the signal structure can be analyzed.

Thus, the first burst detector 482 is configured to analyze the physical structure of the signal. The first burst detector 482 can use variations of well-known algorithms adapted for this specific purpose. The first burst detector 482 can perform this analysis due at least in part to the preambles being at certain locations and the periodicity of the structure of the received signal.

The first burst detector 482 can implement elements of signal detection theory to determine the presence or absence of a burst and to generate the first burst indicator. The first burst detector is configured to decide between two hypotheses: H0 (the null hypothesis) which is that no burst was received, and H1 (an alternate hypothesis) which is that a burst was received. In detection theory, a detector typically has two types of error: Pmd or the probability of missed detection (sometimes referred to as a Type I error or specificity) and Pfa or the probability of false alarm (sometimes referred to as a Type II error or sensitivity). It is desirable for the receiver 480 to avoid missing legitimate bursts, making it advantageous to try to make the probability of missed detection (Pmd) as low as possible. However, this results in the probability of false alarm (Pfa) to increase. An increase in Pfa results in more false bursts being passed to the iterative decoder 484 for decoding. Advantageously, the second burst detector 486 is configured to reduce the number of false signals (or signals that do not contain an actual burst). It does so by adding a complementary analysis of the informational structure of the signal, thus reducing or eliminating false bursts from the data pipeline after the second burst detector 486.

Because it is undesirable to miss detection of a valid burst, it is advantageous to set Pmd as low as possible. In some embodiments, Pmd is set to be less than or equal to about 1e-4 or less than or equal to about 1e-5. Consequently, Pfa is higher. In some embodiments, Pfa is about 0.01 or about 1e-3. As a result, approximately 1% of false bursts are passed to the decoder 484 for processing, meaning that about 1% of the time noise is forwarded to the decoder 484 for processing. In such instances, the decoder 484 may fail and output a burst error indicator. This can be used by the second burst detector 486 to determine that a burst is not present in the signal. The burst error may occur because (a) in reality there was a burst but SNR was poor and the decoder 484 failed, or (b) there was no burst, but the first burst detector 482 indicated that there was a burst (e.g., a false alarm). Because Pfa is relatively high, the receiver 480 includes the second burst detector 486 to improve decoder error statistics or to identify signals indicated as having a burst present where there is no burst present in actuality.

In some embodiments, the first burst detector 482 is configured to estimate a probability that a burst is present in the received digital signal. In various embodiments, the number of iterations of the iterative decoder 484 is affected by the estimated probability. In certain implementations, the first burst indicator corresponds to the estimated probability that a burst is present in the received digital signal. In various implementations, the first burst detector 482 utilizes threshold values compared to the estimated probability. Above a high probability, the first burst indicator indicates that a burst is present, below a low probability, the first burst indicator indicates that a burst is not present, and between the high and low probabilities, the first burst indicator indicates that it is uncertain if there is a burst. The threshold values for indicating that a burst is present can be related to a targeted false alarm probability. In some embodiments, the number of iterations the decoder 484 uses to decode the is affected by the first burst indicator. In certain implementations, such as where the first burst indicator includes an estimate of a signal parameter (e.g., SNR or total power) or an estimate of a probability of a burst being present, the number of iterations can scale with or otherwise correspond to the first burst indicator. This may be advantageous to limit processing cycles spent on signals that do not contain a burst or that are unlikely to include a burst.

In some embodiments, the first burst detector can use a likelihood ratio test (LRT) to determine the presence of a burst in the received signal. In particular, a theorem known as the Neyman-Pearson theorem can be used to minimize Pmd, which is equivalent to maximizing the probability of detection of a signal. In this theorem, for a given Pfa, decide on H1 if:

$$\frac{p(z; H1)}{p(z; H0)} \geq \gamma$$

where z is the number of samples used by the detector and γ is a threshold which depends on the Pfa. This approach is known as the likelihood ratio test (LRT) and is provably optimal in that it minimizes Pmd for a given Pfa.

However, a difficulty may arise due at least in part to the samples, z, used by the first burst detector 482 depending on some parameters that are a priori unknown. Examples of such parameters include, for example, frequency offset, phase offset, channel gain, noise variance, symbol values, etc. Advantageously, the generalized LRT (GLRT) approach uses the same technique as the LRT, except replaces the unknown parameters with the maximum likelihood (ML) estimates of those parameters.

Thus, the first burst detector 482 can use a NP-GLRT approach. This approach involves starting with the LRT formulation set forth above and applying it to the particular values determined for the analysis (e.g., Pmd less than a first constant, c1, and Pfa less than a second constant, c2, where c2>c1):

$$\Lambda(z) =$$

$$\log(p(z;H1)) - \log(p(z;H0)) = \frac{1}{\sigma^2} \sum_{m=1}^{N_{ambset}} \sum_{n=1}^{N_m} \left( \|z_{m,n}\|^2 - \|z_{m,n} - |h|e^{j\theta_m}\|^2 \right)$$

In the LRT formulation, there are unknown parameters (e.g., $\sigma^2$, $|h|$, $\theta_m$) thus ML estimates for these parameters can be determined and used to replace those missing elements in the LRT formulation. Then, Pfa and Pmd can be determined for various values of the threshold, γ. The ML estimates of parameters can be closed form mathematical expressions, relatively simple to implement, and may use only the known ambles of bursts:

$$\widehat{\theta_{m,ML}} = \arctan \frac{\sum_{n=1}^{N_m} z_{m,n,I}}{\sum_{n=1}^{N_m} z_{m,n,R}}$$

$$\widehat{h|_{ML}} = \frac{1}{P} \sum_{m=1}^{N_{ambset}} \sum_{n=1}^{N_m} (z_{m,n,R}\cos\theta_m + z_{m,n,I}\sin\theta_m)$$

$$\widehat{\sigma^2_{ML,DA}} = \frac{1}{P} \sum_{i=1}^{P} \|z_i - \widehat{h_{ML}}\|^2$$

Constant false alarm ratio (CFAR) is another detection technique that may be used by the first burst detector 482. CFAR and NP-GLT are configured to work on the known ambles of each burst. CFAR techniques include CFAR-sum of ratios (CFAR-SOR):

$$\Lambda_{noncoh,CFAR-SOR} = \sum_{m=1}^{N_{ambset}} \Lambda_m = \sum_{m=1}^{N_{ambset}} \frac{\left|\sum_{n=1}^{N_m} x^*_{m,n} y_{m,n}\right|^2}{\sum_{n=1}^{N_m} |y_{m,n}|^2}$$

and CFAR-ratio of sums (CFAR-ROS):

$$\Lambda_{noncoh,CFAR-ROS} = \frac{\sum_{m=1}^{N_{ambset}} \left|\sum_{n=1}^{N_m} x^*_{m,n} y_{m,n}\right|^2}{\sum_{m=1}^{N_{ambset}} \sum_{n=1}^{N_m} |y_{m,n}|^2}$$

either of which may be implemented in the first burst detector 482. Thus, the first burst detector 482 is configured to analyze the physical structure of the received digital signal using a Neyman-Pearson generalized likelihood ratio test (NP-GLRT), the first burst detector is configured to analyze the physical structure of the received digital signal using a constant false alarm rate (CFAR) detector wherein the constant false alarm rate detector comprises a constant false alarm rate sum of ratios (CFAR-SOR) detector or a constant false alarm rate ratio of sums (CFAR-ROS) detector.

In some embodiments, the first burst detector 482 is configured to use a signal to noise ratio estimator and/or a total power estimator. In certain implementations, the first burst detector 482 uses iterative methods to determine these parameters. For example, the first burst detector 482 uses an expectation-step and maximization-step (EM-based) SNR estimator. These techniques represent non-data-aided iterative estimators. The single shot estimator techniques described above (e.g., NP-GLRT and CFAR) can be considered to be data-aided techniques because they rely on the use of known pilot symbols (e.g., ambles).

In some embodiments, the first burst detector 482 provides a multi-stage decision region. For example, based on an output of the analysis (e.g., an estimated SNR), the first burst detector 482 generates a first burst indicator that is based on thresholds. The thresholds may be based on target false alarm and/or misdetection probabilities. In such an example, if the estimated signal to noise ratio (SNR) is greater than or equal to a high threshold value, the first burst indicator indicates that a burst is present and, in response, the iterative decoder 484 can perform a maximum number of iterations to decode the signal (e.g., 100 iterations). If the estimated SNR is less than or equal to a low threshold value, the first burst indicator indicates that a burst is not present and, in response, the iterative decoder 484 can perform a minimum number of iterations to decode the signal (e.g., 1 iterations). If the estimated SNR is between the high threshold value and the low threshold value, the first burst indicator indicates that a burst is uncertain and, in response, the iterative decoder 484 can perform a number of iterations that is between the minimum and maximum number to decode the signal (e.g., 40 iterations). Where the burst is uncertain as determined by the first burst detector 482, the second burst detector 486 advantageously provides a second burst indicator that can improve the result, or increase the probability that the determination of the presence of a burst is closer to 1.

The second burst detector 486 is configured to generate a second burst indicator by analyzing an informational structure of a decoded signal that corresponds to the received digital signal to determine whether a burst is present in the received digital signal. The informational structure of signal can be related to the data symbols within the bursts. The data symbols within the bursts carry information that is encoded and transmitted from the transmitter. The decoder 484 at the receiver 480 determines the information content by iteratively decoding the encoded bits. This process may be time-consuming and computationally complex. The first burst detector 482 is not aware of this information content, but the second burst detector 486 can be made aware by the decoder 484. For example, the decoder 484 can send metrics about (a) hard decisions (e.g., whether decoding a burst was successful or not), or (b) soft decisions (e.g., log-likelihood ratios), which can provide the second burst detector 486 additional information about the burst that was not available before the decoding operation.

Informational structure of the signal can include a total power estimate, a SNR estimate, $Q^2$ values of the decoded signal, $I^2$ values of the decoded signal, a decoder error parameter, and the like. The second burst detector 486 uses outputs of the decoders 484 to determine the second burst indicator. These outputs may include estimators such as total power, SNR, $I^2$, $Q^2$, etc. This improves the determination regarding the presence of a burst. Consequently, the second burst detector 486 can be configured to distinguish between a true burst error and a false alarm burst error. The second burst detector 486 is configured to work on output indicators of iterative decoders and looks at information content of the signal and how it conforms with a valid signal.

Analysis of the physical structure of the signal is limited by generic system design, but the informational structure is dependent on specific transmitted signals and hence may provide more information. However, in order to determine the informational structure of the signal, more processing is required (e.g., the decoders 484 must work to decode the signal). Thus, the receiver 480 includes a two-stage detector wherein the first burst indicator 482 works with the physical structure of the signal, which may lead to relatively inaccurate results, but generally eliminates a significant amount of unnecessary processing by eliminating a large number of signals without a burst present. The second burst detector 486 can then rely on more computationally complex and demanding techniques to improve the determination of the presence of a burst in the signal. Thus, the first stage saves computational complexity and the second stage helps in refining decisions and accurately managing performance metrics and diagnostics. For example, the first burst detector 482 determines, given the received samples, whether a burst is present, and the second burst detector 486 determines, given the total power estimate (for example) and the fact that the decoder indicated a burst error, whether a burst is present.

The second burst detector 486 relies on the decoder 484 to complete its iterations (which may be affected by the output of the first burst detector 482, as described herein) and to provide hard/soft decisions about the burst. The second burst detector 486 does not work with samples, rather it works on data such as total power measurement estimates that is an output of the decoders 484 and the burst error metric that is an output of the decoders 484. If the decoder 484 fails, it sends a signal to say that burst failed which acts as input to the second burst detector 486. Thus, the second burst detector can be used to clean up the burst error due to the false alarm rate of the NP-GLRT detector (first burst detector) or the false alarm rate of the first burst detector arising from the algorithm used (e.g., NP-GLRT).

In some embodiments, by way of example, the second burst detector 486 is configured to monitor noise power measurements. The noise power measurements can be monitored for signals or user terminals with similar characteristics, including signals for similar carriers in a return carrier group. The noise power can be measured over time to determine an estimate of the noise power for signals or user terminals with similar characteristics. The second burst detector 486 can compare the total power measurement or estimate for a signal and compare it to the noise power measurement. If the total power measurement is a threshold amount above the noise power measurement, the second burst detector 486 can determine that a burst is present, otherwise the second burst detector 486 can determine that a burst is not present.

The iterative decoder 484 is configured to decode the received digitized signal by iteratively processing the received digital signal to generate the decoded signal, a number of iterations affected by the first burst indicator generated by the first burst detector. The iterative decoder 484 is configured to operate in series or in parallel with first burst detector 482.

In some embodiments, the number of iterations is limited to a minimum iteration number if the first burst indicator indicates a burst is absent in the received digital signal and is limited to a maximum iteration number if the burst indicator indicates a burst is present in the received digital signal, where the maximum iteration number is greater than the minimum iteration number. In some embodiments, the number of iterations is between the minimum iteration number and the maximum iteration number responsive to the first burst indicator indicating a burst is uncertain in the received digital signal. In some embodiments, the first burst detector 482 estimates a probability that a burst is present in the received digital signal and the number of iterations is affected by the estimated probability. In some embodiments, the decoders 484 are configured to send a signal to the second burst detector 486 that a burst was not received (which may be based on the first burst indicator). In some embodiments, the iteration count of the decoders 484 is based on the output of the first burst detector 482. In certain implementations, the number of iterations can be stepped regions related to the first burst indicator (e.g., bins or decision regions), or it may be a single region (e.g., if the burst is uncertain, iterate 40 times), or it may be a value that scales with the continuous output of the first burst detector 482 (e.g., the first burst indicator may be a value between 0 and 1 and the number of iterations scales with this value).

Figure 6:
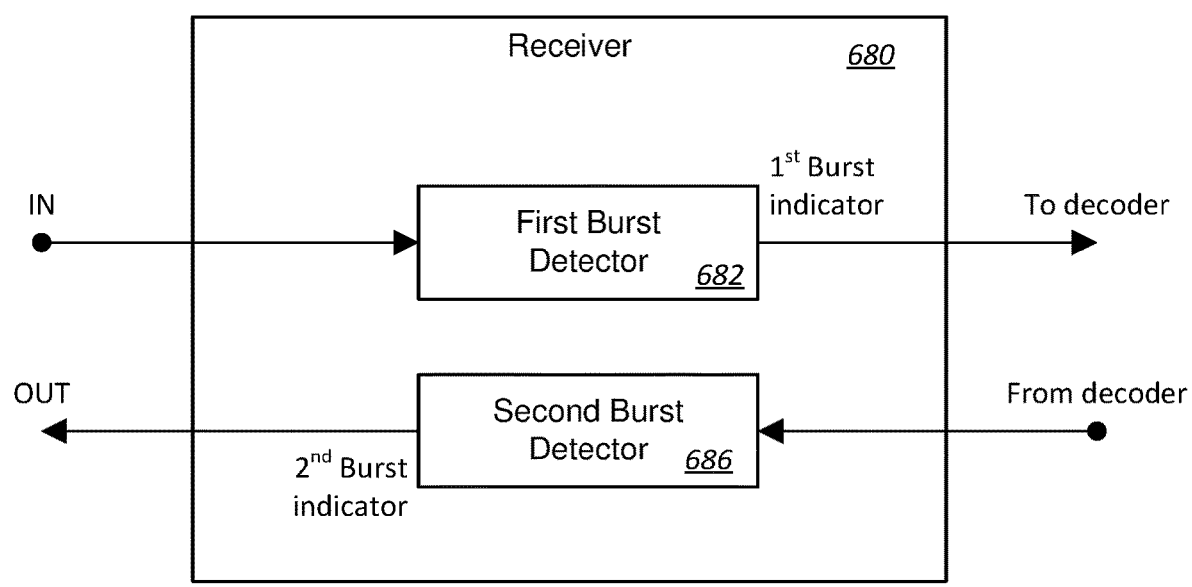
FIG. 6 illustrates another example receiver configured to discriminate between data bursts and selective non-transmission of data.

FIG. 6 illustrates another example receiver 680 configured to discriminate between data bursts and selective non-transmission of data. The receiver 680 is implemented as a two-stage burst detector comprising a first burst detector 682 and a second burst detector 686. The first burst detector 682 is similar to the first burst detector 482 described herein with respect to FIG. 4. For example, the first burst detector 682 is configured to receive a digitized signal transmitted over a channel and to generate a first burst indicator by analyzing a physical structure of the receive digitized signal to determine whether a burst is present in the received digital signal. Also, the second burst detector 686 is similar to the second burst detector 486 described herein with respect to FIG. 4. For example, the second burst detector 686 is configured to generate a second burst indicator by analyzing an informational structure of a decoded signal that corresponds to the received digital signal to determine whether a burst is present in the received digital signal. In some embodiments, the receiver 680 can be configured to interact with a signal decoder that is separate from the receiver 680. This allows the receiver 680 to be implemented with any suitable signal decoder, such as any of the iterative signal decoders described herein. In some embodiments, the decoder is integrated with the receiver 680.

The receiver 680 is configured to receive a digitized signal, which may include I/O samples, for example. The first burst detector 682 analyzes the digitized signal, including the physical structure of the signal, and generates a first burst indicator. The digitized signal and first burst indicator are passed to a decoder to decode the signal. The decoder can be part of the receiver 680 or separate from the receiver 680. The receiver 680 is configured to receive data from the decoder in the second burst detector 686. The second burst detector 686 analyzes decoder output, including the informational structure of the digitized signal, and generates a second burst indicator. The second burst indicator can be sent to other systems or used by other components of the receiver 680.

Example Method for Detecting Bursts with a Two-Stage Burst Detector

Figure 7:
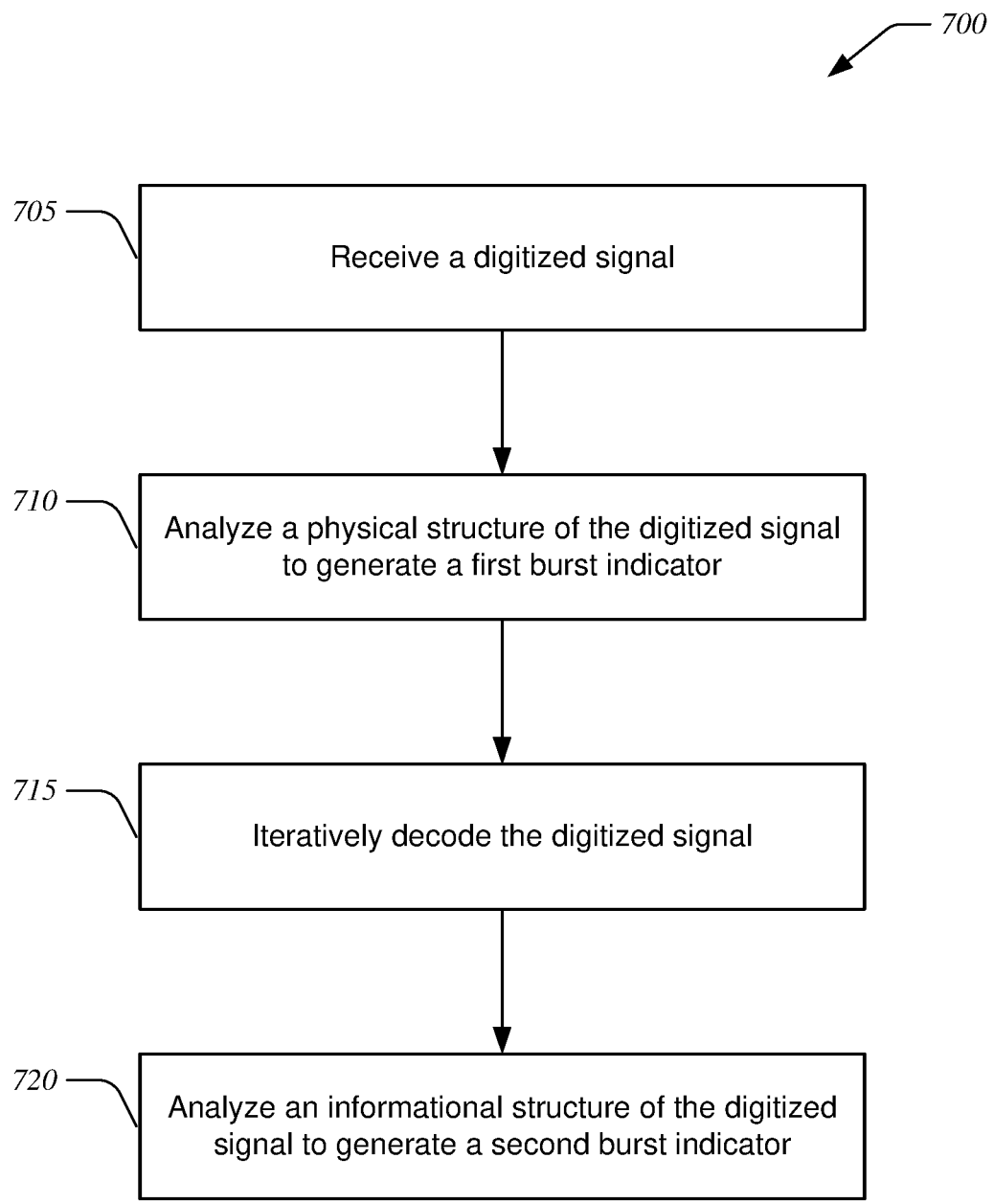
FIG. 7 illustrates a flow chart of an example method for detecting bursts in a transmitted signal in a communications network.

FIG. 7 illustrates a flow chart of an example method 700 for detecting bursts in a transmitted signal in a communications network. The method 700 can be performed in any of the receivers described herein with reference to FIGS. 1-4 and 6. For ease of description, the method 700 will be described as being performed by a receiver. This is not to be understood to limit the scope of the disclosure. Rather, any step or portion of the method 700 can be performed by any component or combination of components of the communications networks described herein.

In block 705, the receiver receives a digitized signal. The digitized signal can comprise IQ samples. The digitized signal can be received over a transmission channel which may comprise a return-link channel.

In block 710, the receiver analyzes a physical structure of the digitize signal to generate a first burst indicator. Analysis of the physical structure can be based on a single shot estimator such as NP-GLRT or CFAR or it can be based on an iterative estimator, such as an EM-based SNR estimator. The physical structure of the signal can include known pilot signals, such as ambles. The physical structure of the signal can include a periodic structure of data and ambles within codewords that are preceded by a preamble. The first burst indicator can indicate the presence or absence of a burst in the digitized signal. In some embodiments, the first burst indicator indicates a discrete value with 2 or more values that corresponds to the presence, absence, or certainty that a burst is present in the digitized signal. In some embodiments, the first burst indicator corresponds to a probability of the presence of a burst. In various embodiments, the first burst indicator corresponds to an estimated property of the digitized signal (e.g., SNR, total power, etc.).

In block 715, the receiver iteratively decodes the digitized signal. The number of iterations may be affected by the result of the analysis in block 710. The receiver can generate outputs based on the iterative decoding process. The outputs can include the total signal power, SNR, $I^2$ and/or $Q^2$ values, a burst error indicator, and the like.

In block 720, the receiver analyzes an informational structure of the digitized signal to generate a second burst indicator. The informational structure can include the outputs provide in block 715. The informational structure of the digitized and decoded signal can include a total power estimate, a SNR estimate, and the like. The analysis of the informational structure can improve the result of the analysis performed in block 710.

In some embodiments, some of the steps of the method 700 may be performed in parallel or simultaneously, and not necessarily sequentially. For example, the processing in blocks 710 and 715 can occur either sequentially or in parallel. In certain embodiments, the first burst detector may complete the analysis of the physical structure (block 710) and determine the number of decoder iterations, and then processing of block 715 can start. This can advantageously reduce computational complexity at the decoder. In various embodiments, the decoder may start its iterations while the first burst detector is also analyzing the signal. If the first burst detector determines no burst is present, it can send an interrupt to the decoder to stop processing. This can advantageously lower the overall latency of the system.

Additional Embodiments

Figure 8:
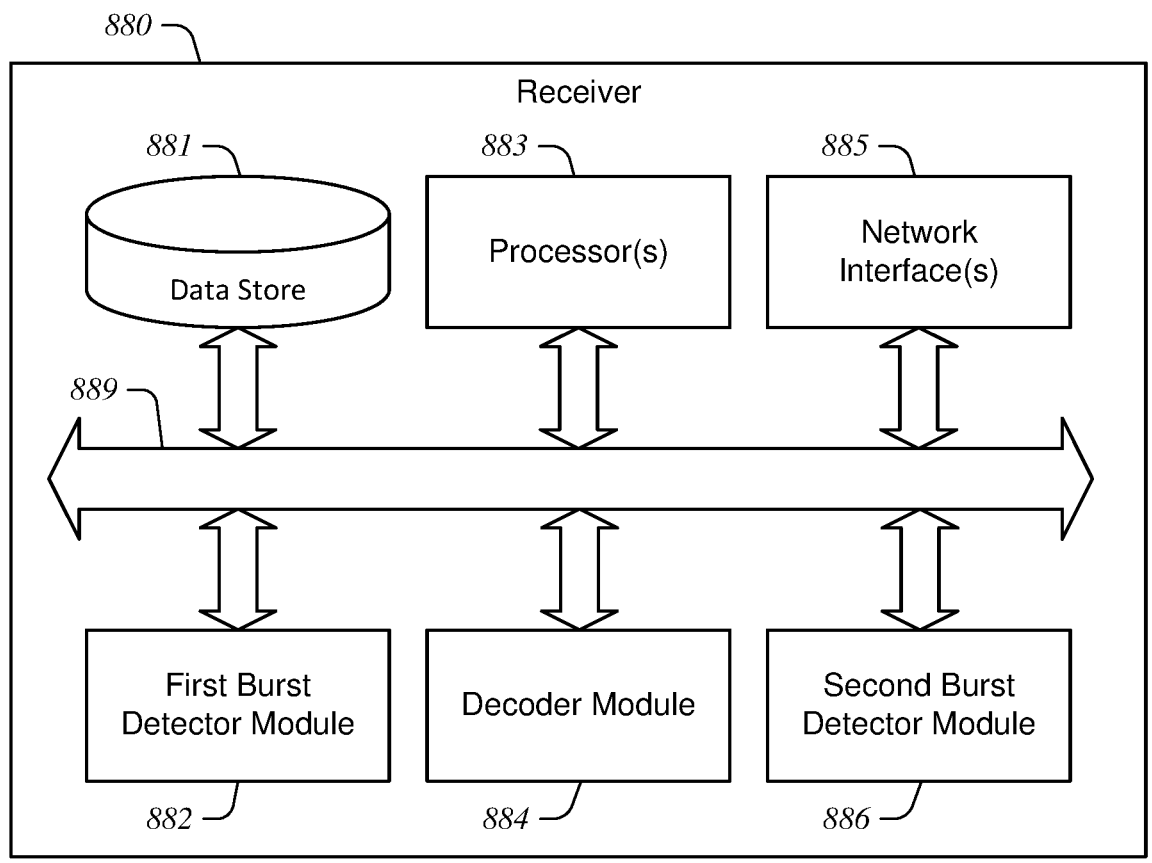
FIG. 8 illustrates a block diagram of an example receiver configured to detect bursts in a transmission channel using a two-stage burst detector.

FIG. 8 illustrates a block diagram of an example receiver 880 configured to detect bursts in a transmission channel using a two-stage burst detector. The receiver 880 is configured to analyze a physical structure of a signal and an informational structure of a signal to determine whether a burst is present or absent. The receiver 880 is similar to the receivers described herein with reference to FIGS. 1-4 and 6 and can be implemented in any of the communications systems described herein. The receiver 880 can employ any method described herein for detecting and identifying bursts in transmitted signals, such as the example method 700 described herein with reference to FIG. 7.

The receiver 880 can include hardware, software, and/or firmware components for detecting bursts and decoding digital signals. The receiver 880 includes a data store 881, one or more processors 883, one or more network interfaces 885, a first burst detector module 882, a decoder module 884, and a second burst detector module 886. Components of receiver 880 can communicate with one another, with external systems, and with other components of a network using communication bus 889. The receiver 880 can be implemented using one or more computing devices. For example, the receiver 880 can be implemented using a single computing device, multiple computing devices, a distributed computing environment, or it can be located in a virtual device residing in a public or private computing cloud. In a distributed computing environment, one or more computing devices can be configured to provide the modules 882, 884, 886 to provide the described functionality.

The receiver 880 includes the first burst detector module 882 to analyze a physical structure of a received digital signal to determine if the signal includes a burst, as described herein. The receiver 880 includes the second burst detector module 886 to analyze an informational structure of a received digital signal to determine if the decoded signal includes a burst, as described herein. The receiver 880 includes the decoder module 884 to decode the received digital signal, as described herein. In some embodiments, the decoder module 884 iteratively processes the received digital signal to decode it. In some embodiments, the decoder module 884 is affected by the output of the first burst detector module 882. In some embodiments, the second burst detector module 886 uses information extracted or determined by the decoder module 884 to determine the presence or absence of a burst in the received digital signal.

The receiver 880 includes one or more processors 883 that are configured to control operation of the modules 882, 884, 886 and the data store 881. The one or more processors 883 implement and utilize the software modules, hardware components, and/or firmware elements configured to detect bursts in transmitted signals and to decode transmitted signals. The one or more processors 883 can include any suitable computer processors, application-specific integrated circuits (ASICs), field programmable gate array (FPGAs), or other suitable microprocessors. The one or more processors 883 can include other computing components configured to interface with the various modules and data stores of the receiver 880.

The receiver 880 includes the data store 881 configured to store configuration data, analysis parameters, control commands, databases, algorithms, executable instructions (e.g., instructions for the one or more processors 883), and the like. The data store 881 can be any suitable data storage device or combination of devices that include, for example and without limitation, random access memory, read-only memory, solid-state disks, hard drives, flash drives, bubble memory, and the like.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any single computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general-purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A receiver of a communications system, the receiver comprising:
   a first burst detector configured to receive a digitized signal transmitted over a channel and to generate a first burst indicator by analyzing a physical structure of the receive digitized signal to determine whether a burst is present in the received digital signal; and
   a second burst detector configured to generate a second burst indicator by analyzing an informational structure of a decoded signal that corresponds to the received digital signal to determine whether a burst is present in the received digital signal,
   wherein the first burst detector analyzes the physical structure of the received digital signal using a data-aided analysis based on known pilot symbols, the known pilot symbols comprising ambles of the received digital signal.

2. The receiver of claim 1 further comprising an iterative decoder configured to decode the received digitized signal by iteratively processing the received digital signal to generate the decoded signal, a number of iterations affected by the first burst indicator generated by the first burst detector.

3. The receiver of claim 2, wherein the iterative decoder and the first burst detector operate at least partially in parallel.

4. The receiver of claim 2, wherein the number of iterations is limited to a minimum iteration number if the first burst indicator indicates a burst is absent in the received digital signal and is limited to a maximum iteration number if the first burst indicator indicates a burst is present in the received digital signal, where the maximum iteration number is greater than or equal to the minimum iteration number, and the number of iterations is between the minimum iteration number and the maximum iteration number responsive to the first burst indicator indicating a burst is uncertain in the received digital signal.

5. The receiver of claim 2, wherein the first burst detector estimates a probability that a burst is present in the received digital signal and the number of iterations is affected by the estimated probability.

6. The receiver of claim 1, wherein the first burst detector analyzes the physical structure of the received digital signal using a Neyman-Pearson generalized likelihood ratio test (NP-GLRT) or a constant false alarm rate (CFAR) detector, the constant false alarm rate detector comprising a constant false alarm rate sum of ratios (CFAR-SOR) detector or a constant false alarm rate ratio of sums (CFAR-ROS) detector.

7. The receiver of claim 1, wherein the first burst detector analyzes the physical structure of the received digital signal using a signal to noise ratio estimator or a total power estimator.

8. The receiver of claim 1, wherein the first burst detector analyzes the physical structure of the received digital signal by estimating a probability that a burst is present in the received digital signal and the first burst indicator corresponds to the estimated probability that a burst is present in the received digital signal.

9. The receiver of claim 8 further comprising an iterative decoder configured to decode the received digitized signal by iteratively processing the received digital signal to generate the decoded signal, behavior of the iterative decoder affected by the first burst indicator.

10. The receiver of claim 8, wherein the first burst indicator indicates that a burst is present in the received digital signal responsive to the estimated probability being greater than a first value and that a burst is absent responsive to the estimated probability being less than the first value.

11. The receiver of claim 10, wherein the first value is based on a targeted false alarm probability.

12. The receiver of claim 8, wherein the first burst indicator indicates that a burst is present in the received digital signal responsive to the estimated probability being greater than a first value, that a burst is absent responsive to the estimated probability being less than a second value, and that a burst is uncertain responsive to the estimated probability being between the first value and the second value.

13. The receiver of claim 12 further comprising an iterative decoder configured to decode the received digitized signal by iteratively processing the received digital signal to generate the decoded signal, a number of iterations set to a minimum iteration value responsive to the first indicator indicating that a burst is absent, the number of iterations set to a maximum iteration value responsive to the first indicator indicating that a burst is present, and the number of iterations set to a medium iteration value between the minimum iteration value and the maximum iteration value responsive to the first indicator indicating that a burst is uncertain.

14. The receiver of claim 1, wherein the second burst detector analyzes the informational structure of the decoded signal by analyzing a total power estimate of the received digital signal to generate the second burst indicator.

15. The receiver of claim 1, wherein the second burst detector analyzes the informational structure of the decoded signal by analyzing a signal-to-noise ratio of the received digital signal to generate the second burst indicator.

16. The receiver of claim 1, wherein the second burst detector analyzes the informational structure of the decoded signal by analyzing a decoder error parameter associated with the decoded signal to generate the second burst indicator.

17. A method for determining the presence of a burst in a communications system, the method comprising:

receiving a digitized signal transmitted over a channel;

generating a first burst indicator using a first burst detector by analyzing a physical structure of the receive digitized signal to determine whether a burst is present in the received digital signal; and generating a second burst indicator using a second burst detector by analyzing an informational structure of a decoded signal that corresponds to the received digital signal to determine whether a burst is present in the received digital signal, wherein analyzing the physical structure of the received digital signal uses a data-aided analysis based on known pilot symbols, the known pilot symbols comprising ambles of the received digital signal.

18. The method of claim 17 further comprising decoding the received digitized signal by iteratively processing the received digital signal to generate the decoded signal, a number of iterations affected by the first burst indicator.

19. The method of claim 18, wherein decoding and generating the first burst indicator occur at least partially in parallel.

20. The method of claim 18, wherein the number of iterations is limited to a minimum iteration number if the first burst indicator indicates a burst is absent in the received digital signal and is limited to a maximum iteration number if the first burst indicator indicates a burst is present in the received digital signal, where the maximum iteration number is greater than or equal to the minimum iteration number, and the number of iterations is between the minimum iteration number and the maximum iteration number responsive to the first burst indicator indicating a burst is uncertain in the received digital signal.

21. The method of claim 18 further comprising estimating a probability that a burst is present in the received digital signal and the number of iterations is affected by the estimated probability.

22. The method of claim 17, wherein analyzing the physical structure of the received digital signal uses a Neyman-Pearson generalized likelihood ratio test (NP-GLRT) or a constant false alarm rate (CFAR) detector, the constant false alarm rate detector comprising a constant false alarm rate sum of ratios (CFAR-SOR) detector or a constant false alarm rate ratio of sums (CFAR-ROS) detector.

23. The method of claim 17, wherein analyzing the physical structure of the received digital signal uses a signal to noise ratio estimator or a total power estimator.

24. The method of claim 17, wherein analyzing the physical structure of the received digital signal estimates a probability that a burst is present in the received digital signal and the first burst indicator corresponds to the estimated probability that a burst is present in the received digital signal.

25. The method of claim 24, wherein the first burst indicator indicates that a burst is present in the received digital signal responsive to the estimated probability being greater than a first value and that a burst is absent responsive to the estimated probability being less than the first value.

26. The method of claim 25, wherein the first value is based on a targeted false alarm probability.

27. The method of claim 17 further comprising decoding the received digitized signal by iteratively processing the received digital signal to generate the decoded signal, decoding affected by the first burst indicator.

28. The method of claim 17, wherein the first burst indicator indicates that a burst is present in the received digital signal responsive to the estimated probability being greater than a first value, that a burst is absent responsive to the estimated probability being less than a second value, and that a burst is uncertain responsive to the estimated probability being between the first value and the second value.

29. The method of claim 28 further comprising decoding the received digitized signal by iteratively processing the received digital signal to generate the decoded signal, a number of iterations set to a minimum iteration value responsive to the first indicator indicating that a burst is absent, the number of iterations set to a maximum iteration value responsive to the first indicator indicating that a burst is present, and the number of iterations set to a medium iteration value between the minimum iteration value and the maximum iteration value responsive to the first indicator indicating that a burst is uncertain.

30. The method of claim 17, wherein analyzing the informational structure of the decoded signal analyzes a total power estimate of the received digital signal to generate the second burst indicator.

31. The method of claim 17, wherein analyzing the informational structure of the decoded signal analyzes a signal-to-noise ratio of the received digital signal to generate the second burst indicator.

32. The method of claim 17, wherein analyzing the informational structure of the decoded signal analyzes a decoder error parameter associated with the decoded signal to generate the second burst indicator.

* * * * *